Dec. 2, 1952         P. S. WINNEK          2,620,336
STREPTOMYCIN SULFONAMIDES AND PROCESS FOR PREPARATION
Filed Feb. 5, 1948                           3 Sheets—Sheet 2
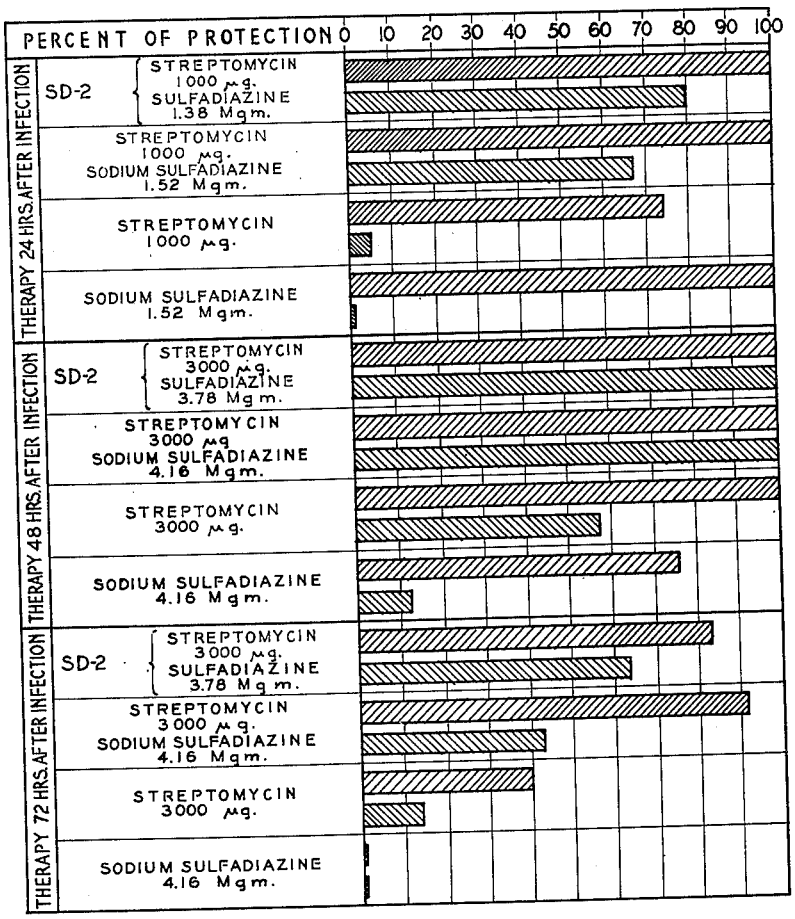
FIGURE II.
INVENTOR
Philip S. Winnek
BY Francis M. Crawford
ATTORNEY Dec. 2, 1952  P. S. WINNEK  2,620,336
STREPTOMYCIN SULFONAMIDES AND PROCESS FOR PREPARATION
Filed Feb. 5, 1948  3 Sheets-Sheet 3
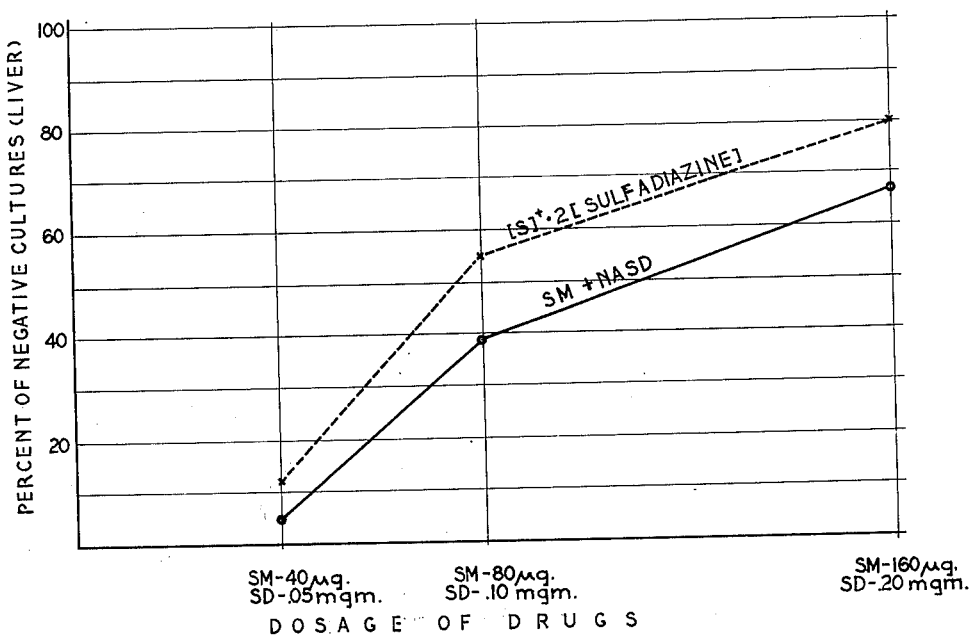
FIGURE III.
INVENTOR
Philip S. Winnek
BY Francis M. Crawford
ATTORNEY Patented Dec. 2, 1952

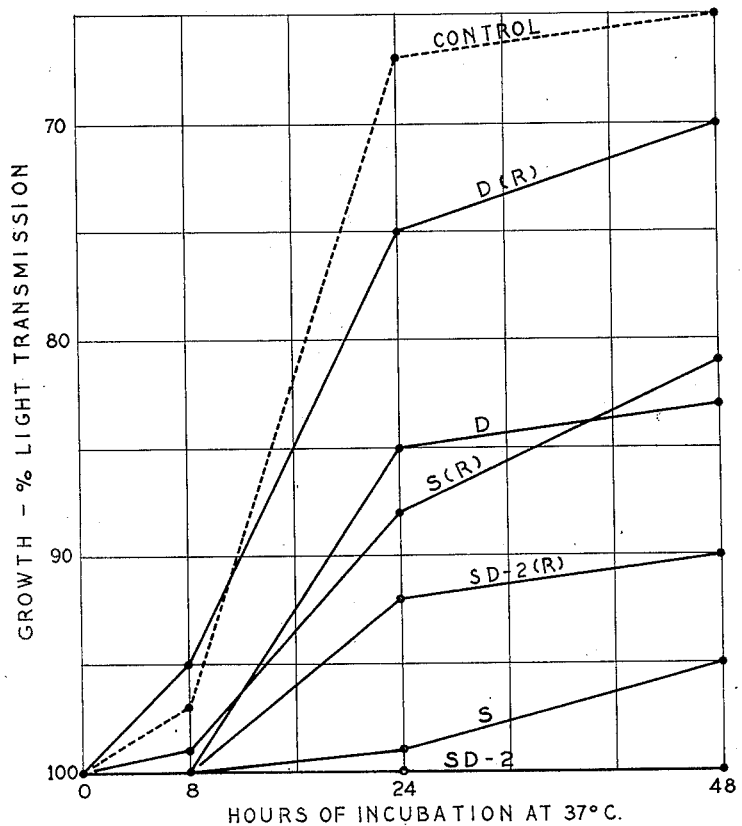
FIGURE I.
LEGEND
TEST ORGANISM — STAPHYLOCOCCUS AUREUS
D = SODIUM SULPHADIAZINE — 10 μg/ml (1:100,000)
S = STREPTOMYCIN (10 μg/ml)
SD-2 = [S]⁺·2[SULPHADIAZINE] (20 μg/ml)
R = RECULTURED (RECULTURED 24 HRS. AT 37°C
   IN ANTIBIOTIC-FREE MEDIA)

2,620,336

UNITED STATES PATENT OFFICE 2,620,336

STREPTOMYCIN SULFONAMIDES AND PROCESS FOR PREPARATION

Philip S. Winnek, Terre Haute, Ind., assignor to Commercial Solvents Corporation, Terre Haute, Ind., a corporation of Maryland Application February 5, 1948, Serial No. 6,391

11 Claims. (Cl. 260—210)

My invention relates to a new class of chemical compounds and to methods for their preparation. More particularly it relates to derivatives of streptomycin and sulfanilamide and its N'-monosubstituted derivatives.

While the chemical structure of streptomycin has only recently been worked out and there may be some question as to the correctness of its proposed structure, it has been well established that streptomycin has three basic groups and may be represented as:

$$[S]^{+++}$$

Sulfanilamide and its N'-monosubstituted derivatives are amphoteric compounds, that is, they may function either as acids or bases, depending on the conditions under which they react. In alkaline solution they react as acids and may be represented as

[Sulfa] or $H_2N\langle\phantom{xx}\rangle SO_2\bar{N}-X$ where X represents H, heterocyclic or substituted heterocyclic groups.

Since stretomycin has three basic groups three different compounds of the following types may be prepared with a particular sulfonamide:

A      [S]-3[Sulfa]

B      [S]$\overset{+}{\text{-}}$2[Sulfa]

C      [S]$\overset{++}{\text{-}}$[Sulfa]

The new compounds of my invention may be produced by reacting aqueous solutions of streptomycin sulfate with solutions of alkaline earth metal salts of sulfanilamide and its N'-monosubstituted derivatives. The process is conveniently carried out by preparing an aqueous solution or suspension of the sulfanilamide or N'-monosubstituted derivative thereof and mixing therewith an aqueous solution of an alkaline earth metal hydroxide, the amount of the latter used determining the types of final product of the character hereinabove described in paragraph three. In the cases of compounds such as types B and C, the product may have either free basic groups or may be in the form of salts of mineral acids. The resulting alkaline earth metal salt of the sulfanilamide or N'-monosubstituted derivative thereof is then slowly mixed with an aqueous streptomycin sulfate solution while agitating the resulting mixture to facilitate reaction. The reaction mixture is then preferably allowed to stand for a period of one-half to two hours at the temperature of an ice refrigerator and the precipitated alkaline earth metal sulfate removed by filtration or other suitable means. The resulting clear filtrate contains the desired streptomycin-sulfanilamide or sulfanilamide N'-monosubstituted derivative. While in some instances it may be satisfactorily used in the dilute aqueous solution form it is generally desirable either to concentrate the solution by evaporation of part of the water or to recover the desired compound in the dried or water-free form, which may be accomplished by such means as evaporation, solvent extraction, or other suitable means. Drying by lyophilization give a product of highly desirable physical characteristics in that ordinarily it goes into solution in water much quicker and with less agitation than a product otherwise dried.

As previously indicated, varying amounts of the alkaline earth metal salt of the sulfanilamide or sulfanilamide N'-monosubstituted derivatives may be reacted with the streptomycin sulfate, one, two, or three molecular equivalents of the former being reacted for each equivalent of the latter, depending upon the type of compound which it is desired to produce.

Examples of compounds of the type included in my invention are those produced with either one, two, or three molecular equivalents of the alkaline earth metal salts of such materials as sulfadiazine, sulfanilamide, sulfapyridine, sulfathiazole, sulfathiadiazole, sulfapyrazine, sulfamerazine, sulfamethazine, sulfanilamido - carboxythiazole, the ethyl derivative of sulfathiadiazole, and the like. Other sulfanilamide N'-monosubstituted derivatives may also be satisfactorily employed.

The compounds of my invention have novel, unexpected and valuable properties as chemotherapeutic agents and possess the added advantage of having low toxicity. The chemotherapeutic components of the compounds exert a synergistic action against pathogenic organisms and in addition the development of resistance by the organism to the compound which takes place with both streptomycin and sulfonamides per se, is retarded. This is illustrated by Figure I which shows the effect by the compound

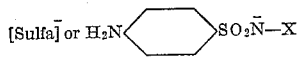

where

[Sulfa]

is sulfadiazine. Many of the compounds are very soluble in water at a neutral pH and can be used for parenteral administration. This is a great advantage over the solutions of the alkali metal salts of the sulfonamides which, in general, are very alkaline and cause sloughing and necrosis unless all of the material is injected directly into the vein.

That the compound

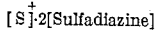

exerts a synergistic or potentiating action of its components in vivo in the chick embryo infected with Br. abortus has been shown by the work of Dr. James M. Shaffer, M. D. and Dr. Wesley W. Spink, M. D. of the Medical School, University of Minnesota. Their results are presented in Figure II. It should be noted that better protection resulted from the use of the compound

than from streptomycin alone, sodium sulfadiazine alone, or a mixture of streptomycin and sodium sulfadiazine.

The most signficant measure of protection is the per cent of embryos in a given infected-treated group free of the infecting organism on culture. This factor has an important bearing on the treatment of human brucellosis where the object of specific therapy is not only control of the infection, but to eradicate the Brucella from the tissues. The superiority in this respect of the compound

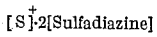

over equivalent amounts of streptomycin (labeled SM) and sodium sulfadiazine (labeled NASD) administered as a mixture is shown in Figure III.

The following examples illustrate the preferred method of preparing my new compounds.

In these examples the parts are expressed by weight except in the case of liquids which are expressed in corresponding parts by volume.

EXAMPLE I

*Compound streptomycin·3 sulfadiazine*

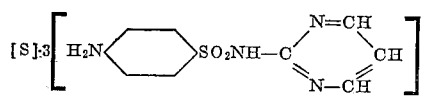

A solution of barium sulfadiazine was first prepared by suspending 13.05 parts of sulfadiazine in 75 parts of distilled water and adding thereto 111.3 parts of a barium hydroxide solution (barium analysis .0324 parts/part). The resulting solution of barium sulfadiazine was then added to 10.37 parts of streptomycin sulfate (sulfate analysis 24.83%) dissolved in 100 parts of distilled water. The reaction mixture was allowed to stand for fifteen minutes and the barium sulfate then removed by filtration. The filtrate was lyophilized to dryness, yielding 19.2 parts of the compound streptomycin·3 sulfadiazine as a light colored solid which on heating charred and decomposed without melting. Its solubility in water was approximately 1%. Analysis gave theoretical values for sulfadiazine content. Assay with B. subtilis (streptomycin-like activity) =326µ/mg.

EXAMPLE II

*Compound streptomycin·2 sulfadiazine*

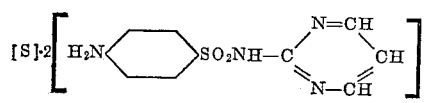

A barium sulfadiazine solution was prepared by dissolving 22.2 parts of sulfadiazine in 374 parts of barium hydroxide solution (barium analysis .02446 parts/part. The resulting solution of barium sulfadiazine was added with stirring to 25.92 parts of streptomycin sulfate (sulfate analysis 24.83%) dissolved in 100 parts of distilled water. The reaction mixture was allowed to stand in a refrigerator for one-half hour and the precipitate of barium sulfate then removed by filtration. The filtrate was lyophilized to dryness, yielding 42 parts of the compound streptomycin·2 sulfadiazine as a light colored solid which on heating charred and decomposed without melting. Its solubility in water was greater than 25%. The pH of a 10% solution was 7.6 Analysis gave theoretical values for sulfadiazine content. Assay with B. subtilis (streptomycin-like activity) =379µ/mg.

EXAMPLE III

*Compound streptomycin·2 sulfadiazine*

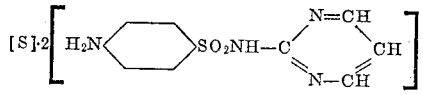

Eight parts of sulfadiazine were suspended in 1000 parts of distilled water and 1.78 parts of calcium hydroxide added with stirring. The resulting calcium sulfadiazine solution was then added gradually with stirring to a solution of 9.8 parts of streptomycin sulfate (sulfate analysis 23.64%) dissolved in 100 parts of distilled water. The resulting reaction mixture was brought rapidly to the boiling point and the precipitate of calcium sulfate removed by filtration. The filtrate was lyophilized to dryness, yielding the compound streptomycin·2 sulfadiazine.

EXAMPLE IV

*Compound streptomycin·1 sulfadiazine*

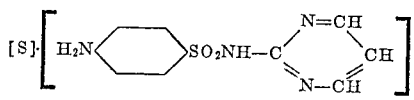

A solution of barium sulfadiazine was prepared by dissolving 4 parts of sulfadiazine in 172.5 parts of barium hydroxide solution (barium analysis .01925 parts/part) and then diluting the resulting solution with 200 parts of water. The solution of barium sulfadiazine thus obtained was then added with stirring to a solution of 9.8 parts of streptomycin sulfate (sulfate analysis 23.64%) dissolved in 200 parts of distilled water. The resulting reaction mixture was allowed to stand in a refrigerator for one and one-half hours and the precipitated barium sulfate removed by filtration. The filtrate was then lyophilized to dryness, yielding the compound streptomycin·1 sulfadiazine as a light colored solid which charred and decomposed on heating without melting. The compound was very soluble in water and a 10% aqueous solution thereof had a pH of approximately 10. Assay with B. subtilis (streptomycin-like activity) =433µ/mg.

EXAMPLE V

*Compound streptomycin ½ sulfate·2 sulfadiazine*

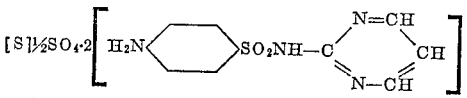

A solution of barium sulfadiazine was prepared by suspending 8.05 parts of sulfadiazine in 200 parts of distilled water and adding thereto a solution of 62 parts of barium hydroxide solution (barium analysis .03575 parts/part). The resulting barium sulfadiazine solution was added gradually with stirring to 9.8 parts of streptomycin sulfate (sulfate analysis 23.64%) dissolved in 200 parts of distilled water. The resulting reaction mixture was placed in a refrigerator for two hours and the precipitated barium sulfate then removed by filtration. The filtrate was next lyophilized to dryness, yielding the compound streptomycin ½ sulfate·2 sulfadiazine which on heating charred and decomposed without melting. The compound was a light colored solid, relatively insoluble in water, the aqueous solution being slightly alkaline. Assay with *B. subtilis* (streptomycin-like activity) =323μ/mg.

EXAMPLE VI

*Compound streptomycin sulfate·1 sulfadiazine*

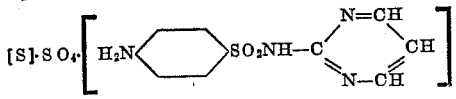

A solution of barium sulfadiazine was prepared by suspending 4.02 parts of sulfadiazine in 200 parts of distilled water and adding thereto 31 parts of barium hydroxide solution (barium analysis .03575 parts/part.) The resulting barium sulfadiazine solution was then added gradually with stirring to a solution of 9.8 parts of streptomycin sulfate (sulfate analysis 23.64%) dissolved in 200 parts of distilled water. After allowing the resulting reaction mixture to stand in a refrigerator for two hours the precipitated barium sulfate was removed by filtration and the filtrate lyophilized to dryness, yielding the compound streptomycin sulfate·1 sulfadiazine. The product was a light colored solid, relatively insoluble in water and on heating charred and decomposed without melting. Assay with *B. subtilis* (streptomycin-like activity)=439μ/mg.

EXAMPLE VII

*Compound streptomycin ½ sulfate·1 sulfadiazine*

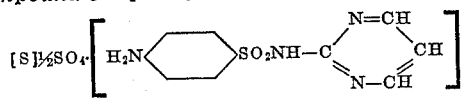

A solution of barium sulfadiazine was prepared by suspending 4.02 parts of sulfadiazine in 200 parts of distilled water and adding thereto 62 parts of barium hydroxide solution (barium analysis .03575 parts/part). The resulting barium sulfadiazine solution was next added gradually with stirring to a solution of 9.8 parts of streptomycin sulfate (sulfate analysis 23.64%) dissolved in 200 parts of distilled water. After allowing the resulting reaction mixture to stand in a refrigerator for two hours the precipitated barium sulfate was removed by filtration and the filtrate lyophilized to dryness, yielding the compound streptomycin ½ sulfate·1 sulfadiazine. The latter product was a light colored solid, very soluble in water, which on heating charred and decomposed without melting. The pH of a 10% aqueous solution was approximately 8.3. Assay with *B. subtilis* (streptomycin-like activity)=449μ/mg.

EXAMPLE VIII

*Compound streptomycin·3 sulfanilamide*

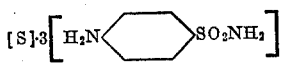

A barium sulfanilamide solution was prepared by dissolving 8.3 parts of solfanilamide in 172.5 parts of barium hydroxide solution (barium analysis .01925 parts/part). The resulting solution of barium sulfanilamide was then added gradually with stirring to a solution of streptomycin sulfate prepared by dissolving 9.8 parts of streptomycin sulfate (sulfate analysis 23.64%) in 200 parts of distilled water. After allowing the resulting reaction mixture to stand for one hour in a refrigerator, the precipitated barium sulfate was removed by filtration and the filtrate lyophilized to dryness, yielding the compound streptomycin·3 sulfanilamide. The product was a light colored solid, relatively insoluble in water, which charred and decomposed on heating without melting. The pH of a 1% aqueous solution of the compound was approximately 10.2. Assay with *B. subtilis* (streptomycin-like activity) =245μ/mg.

EXAMPLE IX

*Compound streptomycin·2 sulfanilamide*

A solution of barium sulfanilamide was prepared by dissolving 5.53 parts of sulfanilamide in 172.5 parts of barium hydroxide solution (barium analysis .01925 parts/part). The resulting solution of barium sulfanilamide was added gradually with stirring to a streptomycin sulfate solution prepared by dissolving 9.8 parts of streptomycin sulfate (sulfate analysis 23.64%) in 200 parts of distilled water. After allowing the reaction mixture to stand in a refrigerator for one hour the precipitated barium sulfate was removed by filtration and the filtrate lyophilized to dryness, yielding the compound streptomycin·2 sulfanilamide which was a light colored slightly hydroscopic solid.

EXAMPLE X

*Compound streptomycin·1 sulfanilamide*

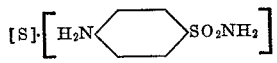

A solution of barium sulfanilamide was prepared by dissolving 2.51 parts of sulfanilamide in 172.5 parts of barium hydroxide solution (barium analysis .01925 parts/part). The resulting solution of barium sulfanilamide was then added gradually with stirring to a solution of streptomycin sulfate prepared by dissolving 9.8 parts of streptomycin sulfate (sulfate analysis 23.64%) in 200 parts of distilled water. The resulting reaction mixture was allowed to stand in a refrigerator for two hours and the precipitated barium sulfate then removed by filtration. The filtrate was dried by lyophilization and yielded the compound streptomycin·1 sulfanilamide which was a light colored, very hydroscopic solid which turned to a liquid on exposure to air.

EXAMPLE XI

*Compound streptomycin ½ sulfate·1 sulfathiazole*

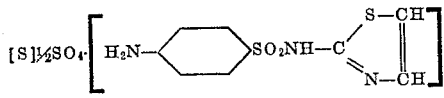

A solution of barium sulfathiazole was prepared by suspended 4.12 parts of sulfathiazole in 2000 parts of water and adding thereto 115 parts of barium hydroxide solution (barium analysis .01925 parts/part). The resulting solution of barium sulfathiazole was then gradually added with stirring to a solution of streptomycin sulfate prepared by dissolving 9.8 parts of streptomycin sulfate (sulfate analysis 23.64%) in 200 parts of distilled water. After allowing the resulting reaction mixture to stand in a refrigerator for one hour the precipitated barium sulfate was removed by filtration and the filtrate lyophilized to dryness, yielding the compound streptomycin ½ sulphate·1 sulfathiazole. The product was a light colored water soluble compound which charred and decomposed on heating without melting. Assay with *B. subtilis* (streptomycin-like activity) =560μ/mg.

EXAMPLE XII

*Compound streptomycin·2 sulfathiazole*

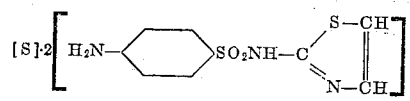

A solution of barium sulfathiazole was prepared by suspending 8.18 parts of sulfathiazole in 3000 parts of water and adding thereto 172.5 parts of barium hydroxide solution (barium analysis .01925 parts/part). The resulting solution of barium sulfathiazole was then added gradually with stirring to a solution of streptomycin sulfate prepared by dissolving 9.8 parts of streptomycin sulfate (sulfate analysis 23.64%) dissolved in 200 parts of distilled water. After allowing the resulting reaction mixture to stand in a refrigerator for one hour the precipitated barium sulfate was removed by filtration and the filtrate lyophilized to dryness, yielding the compound streptomycin·2 sulfathiazole which was a light colored water soluble solid which on heating charred and decomposed without melting. Assay with *B. subtilis* (streptomycin-like activity) =335μ/mg.

EXAMPLE XIII

*Compound streptomycin·3 sulfathiazole*

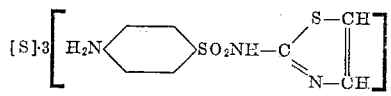

A barium sulfathiazole solution was prepared by suspending 12.3 parts of sulfathiazole in 4000 parts of water and adding thereto 172.5 parts of barium hydroxide solution (barium analysis .01925 parts/part. The resulting solution of barium sulfathiazole was added gradually with stirring to a solution of streptomycin sulfate prepared by dissolving 9.8 parts of streptomycin sulfate (sulfate analysis 23.64%) in 200 parts of distilled water. The resulting reaction mixture was allowed to stand in a refrigerator for two hours and the precipitated barium sulfate then removed by filtration and the filtrate lyophilized to dryness, yielding the compound streptomycin·3 sulfathiazole. The latter product was a light colored solid soluble in water to the extent of less than 1%, which on heating charred and decomposed without melting. Assay with *B. subtilis* (streptomycin-like activity) =221μ/mg.

EXAMPLE XIV

*Compound streptomycin ½ sulfate·1 sulfathiadiazole*

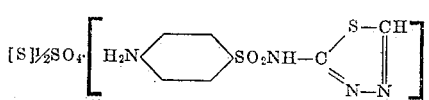

A solution of barium sulfathiadiazole was prepared by dissolving 4.14 parts of sulfathiadiazole in 62 parts of barium hydroxide solution (barium analysis .03575 parts/part). The resulting solution of barium sulfathiadiazole was added gradually with stirring to a solution of streptomycin sulfate prepared by dissolving 9.8 parts of streptomycin sulfate (sulfate analysis 23.64%) in 200 parts of distilled water. Sufficient distilled water was then added to the reaction mixture to make a total volume of approximately 750 parts and the resulting mixture then allowed to stand in a refrigerator for two hours. The precipitated barium sulfate was next removed by filtration and the filtrate lyophilized to dryness yielding the compound streptomycin sulfate·1 sulfathiadiazole which was a light colored water soluble solid which on heating charred and decomposed without melting. The pH of an aqueous solution of the compound was approximately 8.5. Assay with *B. subtilis* (streptomycin-like activity) =398μ/mg.

EXAMPLE XV

*Compound streptomycin·2 sulfathiadiazole*

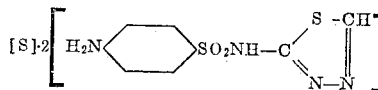

A solution of barium sulfathiadiazole was prepared by suspending 8.25 parts of sulfathiadiazole in 200 parts of distilled water and adding 89.6 parts of barium hydroxide solution (barium analysis .03575 parts/part). The resulting solution of barium sulfathiadiazole was added gradually with stirring to a solution of streptomycin sulfate prepared by dissolving 9.8 parts of streptomycin sulfate (sulfate analysis 23.64%) in 200 parts of distilled water. After allowing the reaction mixture to stand in a refrigerator for two hours and then at room temperature for one hour, the precipitated barium sulfate was removed by filtration and the filtrate lyophilized to dryness yielding the compound streptomycin·2 sulfathiadiazole. The compound was a light colored water soluble solid which on heating charred and decomposed without melting. The pH of an aqueous solution of the compound was approximately 8.5. Assay with *B. subtilis* (streptomycin-like activity) =336μ/mg.

EXAMPLE XVI

*Compound streptomycin·2 sulfamethazine*

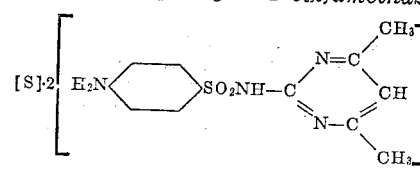

A solution of barium sulfamethazine was prepared by suspending 8.0 parts of sulfamethazine in 200 parts of distilled water and adding thereto 87.3 parts of barium hydroxide solution (barium analysis .03781 parts/part). The resulting barium sulfamethazine solution was then added gradually with stirring to a streptomycin sulfate solution prepared by dissolving 9.8 parts of streptomycin sulfate (sulfate analysis 23.64%) dissolved in 200 parts of distilled water. After allowing the resulting reaction mixture to stand in a refrigerator for one-half hour, the precipitated barium sulfate was removed by filtration and the filtrate lyophilized to dryness yielding the compound streptomycin·2 sulfamethazine. The latter product was a light colored compound which was soluble in water and on heating charred and decomposed without melting. The pH of a 10% aqueous solution was 8.9. Assay with *B. subtilis* (streptomycin-like activity) = $420\mu$/mg.

EXAMPLE XVII

*Compound streptomycin·2 sulfapyridine*

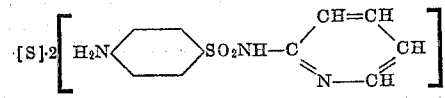

A solution of barium sulfapyridine was prepared by suspending 14.18 parts of sulfapyridine in 750 parts of distilled water and adding thereto 222 parts of barium hydroxide solution (barium analysis .0324 parts/part). The resulting barium sulfapyridine solution was then added gradually with stirring to a solution of streptomycin sulfate prepared by dissolving 20.74 parts of streptomycin sulfate (sulfate analysis 24.83%) in 200 parts of distilled water. After allowing the reaction mixture to stand in a refrigerator for one-half hour, the precipitated barium sulfate was removed by filtration and the filtrate lyophilized to dryness yielding the compound streptomycin·2 sulfapyridine. The latter product was a light colored solid which on heating charred and decomposed without melting. Analysis gave theoretical values for sulfapyridine content. Assay with *B. subtilis* (streptomycin-like activity) = $394\mu$/mg.

EXAMPLE XVIII

*Compound streptomycin·2 sulfapyrazine*

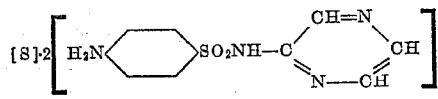

A solution of barium sulfapyrazine was prepared by suspending 7.13 parts of sulfapyrazine in 350 parts of distilled water and adding thereto 111 parts of barium hydroxide solution (barium analysis .0324 parts/part). The resulting barium sulfapyrazine solution was added gradually with stirring to a solution of streptomycin sulfate prepared by dissolving 10.4 parts of streptomycin sulfate (sulfate analysis 24.83%) in 100 parts of distilled water. After allowing the reaction mixture to stand in a refrigerator for one-half hour, the precipitated barium sulfate was removed by filtration and the filtrate lyophilized to dryness yielding the compound streptomycin·2 sulfapyrazine. The latter product was a light colored solid which on heating charred and decomposed without melting. Its solubility in water was approximately 25%. Analysis gave theoretical values for sulfapyrazine content. Assay with *B. subtilis* (streptomycin-like activity) = $376\mu$/mg.

EXAMPLE XIX

*Compound streptomycin·2 sulfamerazine*

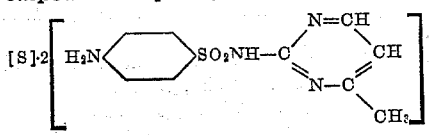

A barium sulfamerazine solution was prepared by suspending 7.21 parts of sulfamerazine in 350 parts of distilled water and adding thereto a solution of 111 parts of barium hydroxide solution (barium analysis .0324 parts/part). The resulting barium sulfamerazine solution was then added gradually with stirring to a streptomycin sulfate solution prepared by dissolving 10.4 parts of streptomycin sulfate (sulfate analysis 24.83%) in 100 parts of distilled water. After allowing the resulting reaction mixture to stand in a refrigerator for one-half hour, the precipitated barium sulfate was removed by filtration and the filtrate lyophilized to dryness yielding the compound streptomycin·2 sulfamerazine. The latter product was a light colored compound which on heating charred and decomposed without melting. Its solubility in water was approximately 10%. Assay with *B. subtilis* (streptomycin-like activity) = $402\mu$/mg.

EXAMPLE XX

*Compound streptomycin·3[2-sulfanilamido-5-carboxythiazole]*

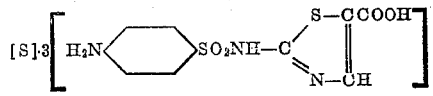

A solution of the calcium salt of 2-sulfanilamido-5-carboxythiazole was prepared by suspending 10 parts of 2-sulfanilamido-5-carboxythiazole in 100 parts of distilled water and adding thereto 1.7 parts of calcium hydroxide. The resulting solution was added to a solution of streptomycin sulfate prepared by dissolving 10 parts of streptomycin sulfate (sulfate analysis 25%) in 100 parts of distilled water. A precipitate of calcium sulfate formed. The mixture was then heated to boiling and the precipitated calcium sulfate removed by filtration. To the cooled filtrate 1500 volumes of methanol were added and the compound streptomycin·3 [2 - sulfanilamido-5-carboxythiazole] precipitated as a gummy product which on treatment with methanol changed to a light colored solid.

The same general procedure used in the above specific examples is also applicable to the reaction of other N′-monosubstituted derivatives of sulfanilamide with streptomycin sulfate. Also, it is understood that other methods of recovering the finished products as well as procedural variations common to the art are understood to be included within the scope of my invention.

What I claim is:

1. The compound represented by the structural formula:

wherein S represents the streptomycin molecule, R represents a member selected from the group consisting of H, pyrimidine, thiomonazole, thiodiazole, pyridine, pyrazine, and substituted pyrimidine, thiomonazole, thiodiazole, pyridine, and pyrazine radicals and $x$ is an integer selected from the group consisting of 1, 2, and 3.

2. The compound represented by the structural formula:

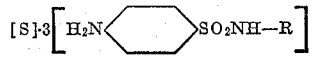

wherein S represents the streptomycin molecule and, R represents a member selected from the group consisting of H, pyrimidine, thiomonazole, thiodiazole, pyridine, pyrazine, and substituted pyrimidine, thiomonazole, thiodiazole, pyridine, and pyrazine radicals.

3. The compound represented by the structural formula:

wherein S represents the streptomycin molecule, R represents H, and $x$ is an integer selected from the group consisting of 1, 2, and 3 and mineral acid salts thereof.

4. The compound represented by the structural formula:

wherein S represents the streptomycin molecule, R represents the radical

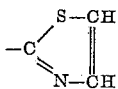

and $x$ is an integer selected from the group consisting of 1, 2, and 3 and mineral acid salts thereof.

5. The compound represented by the structural formula:

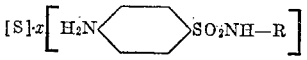

wherein S represents the streptomycin molecule, R represents the radical

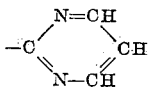

and $x$ is an integer selected from the group consisting of 1, 2, and 3 and mineral acid salts thereof.

6. The process of preparing the compound represented by the structural formula:

wherein S represents the streptomycin molecule, R represents a member selected from the group consisting of H, pyrimidine, thiomonazole, thiodiazole, pyridine, pyrazine, and substituted pyrimidine, thiomonazole, thiodiazole, pyridine, and pyrazine radicals and $x$ is an integer selected from the group consisting of 1, 2, and 3, which comprises reacting streptomycin sulfate with an alkaline earth salt of a compound selected from the group consisting of sulfanilamide and pyrimidine, thiomonazole, thiodiazole, pyridine, pyrazine, and substituted pyrimidine, thiomonazole, thiodiazole, pyridine, and pyrazine derivatives of sulfanilimide.

7. The process of preparing the compound represented by the structural formula:

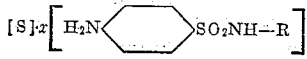

wherein S represents the streptomycin molecule, R represents a member selected from the group consisting of H, pyrimidine, thiomonazole, thiodiazole, pyridine, pyrazine, and substituted pyrimidine, thiomonazole, thiodiazole, pyridine, and pyrazine radicals and $x$ is 1, which comprises reacting streptomycin sulfate with an alkaline earth metal salt of a member selected from the group consisting of sulfanilamide and pyrimidine, thiomonazole, thiodiazole, pyridine, pyrazine, and substituted pyrimidine, thiomonazole, thiodiazole, pyridine, and pyrazine derivatives of sulfanilamide in an amount sufficient to give $x$ the value of 1.

8. The process of preparing the compound represented by the structural formula:

wherein S represents the streptomycin molecule, R represents a member selected from the group consisting of H, pyrimidine, thiomonazole, thiodiazole, pyridine, pyrazine, and substituted pyrimidine, thiomonazole, thiodiazole, pyridine, and pyrazine radicals and $x$ is 2, which comprises reacting streptomycin sulfate with an alkaline earth metal salt of a member selected from the group consisting of sulfanilamide and pyrimidine, thiomonazole, thiodiazole, pyridine, pyrazine, and substituted pyrimidine, thiomonazole, thiodiazole, pyridine, and pyrazine derivatives of sulfanilamide in an amount sufficient to give $x$ the value of 2.

9. The process of preparing the compound represented by the structural formula:

wherein S represents the streptomycin molecule, R represents a member selected from the group consisting of H, pyrimidine, thiomonazole, thiodiazole, pyridine, pyrazine, and substituted pyrimidine, thiomonazole, thiodiazole, pyridine, and pyrazine radicals and $x$ is 3, which comprises reacting streptomycin sulfate with an alkaline earth metal salt of a member selected from the group consisting of sulfanilamide and pyrimidine, thiomonazole, thiodiazole, pyridine, pyrazine, and substituted pyrimidine, thiomonazole, thiodiazole, pyridine, and pyrazine derivatives of sulfanilamide in an amount sufficient to give $x$ the value of 3.

10. The compound represented by the structural formula:

wherein S represents the streptomycin molecule and R represents a member selected from the group consisting of H, pyrimidine, thiomonazole, thiodiazole, pyridine, pyrazine, and substituted pyrimidine, thiomonazole, thiodiazole, pyridine, and pyrazine radicals and mineral acid salts thereof.

11. The compound represented by the structural formula:

wherein S represents the streptomycin molecule and R represents a member selected from the group consisting of H, pyrimidine, thiomonazole, thiodiazole, pyridine, pyrazine, and substituted pyrimidine, thiomonazole, thiodiazole, pyridine, and pyrazine radicals and mineral acid salts thereof.

PHILIP S. WINNEK.

REFERENCES CITED

The following references are of record in the file of this patent:

E. H. Northey—Structure and Chemotherapeutic Activities of Sulfanilamide Derivatives, pp. 169–180 in Chemical Reviews, vol. 27, #1, August 1940.

Manufacturing Chemist and Manufacturing Perfumer, Oct. 1943, vol. 14, p. 321.

Readers Digest, Nov. 1945, page 39.

Moore et al., Jour. Biol. Chem., pages 439–440, October 1946.

Thatcher et al., Journal Urology—pages 902 to 926, May 1947, read at annual meeting, American Urological Assoc., Cincinnati, Ohio—July 25, 1946.

Howes J. Am. Med. Assoc., v. 132 (1946) page 883.

American Jour. Medical Science—pages 136 to 148, Feb. 1948.